United States Patent
Lee et al.

(10) Patent No.: US 9,193,358 B2
(45) Date of Patent: Nov. 24, 2015

(54) SYSTEM FOR INFORMING FUNCTIONS OF VEHICLE

(71) Applicant: Hyundai Motor Company, Seoul (KR)

(72) Inventors: Jaehyun Lee, Seoul (KR); Seung-Chang Park, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 26 days.

(21) Appl. No.: 14/142,685

(22) Filed: Dec. 27, 2013

(65) Prior Publication Data

US 2015/0088375 A1    Mar. 26, 2015

(30) Foreign Application Priority Data

Sep. 26, 2013 (KR) .................. 10-2013-0114709

(51) Int. Cl.
- B60W 50/10 (2012.01)
- B60W 50/14 (2012.01)
- B60W 40/09 (2012.01)

(52) U.S. Cl.
CPC .............. *B60W 40/09* (2013.01); *B60W 50/10* (2013.01); *B60W 50/14* (2013.01); *B60K 2350/108* (2013.01); *B60W 2050/146* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 5,611,753 A * | 3/1997 | Kondo et al. | ................. | 477/118 |
| 6,006,151 A * | 12/1999 | Graf | ................. | 701/57 |
| 8,311,722 B2 * | 11/2012 | Zhang et al. | ................. | 701/104 |
| 8,606,459 B2 * | 12/2013 | Sekiyama et al. | ........... | 701/32.8 |
| 2002/0005779 A1 * | 1/2002 | Ishii et al. | ..................... | 340/436 |
| 2003/0193389 A1 * | 10/2003 | Nitta | .......................... | 340/425.5 |
| 2003/0195694 A1 * | 10/2003 | Kozak et al. | .................. | 701/200 |
| 2009/0326753 A1 * | 12/2009 | Chen et al. | ..................... | 701/29 |
| 2010/0250059 A1 * | 9/2010 | Sekiyama et al. | .............. | 701/35 |
| 2011/0172864 A1 * | 7/2011 | Syed et al. | ..................... | 701/22 |
| 2012/0209632 A1 * | 8/2012 | Kaminski et al. | ................ | 705/4 |
| 2014/0006329 A1 * | 1/2014 | Hu et al. | ......................... | 706/46 |
| 2014/0025259 A1 * | 1/2014 | Szwabowski et al. | .......... | 701/36 |
| 2014/0195272 A1 * | 7/2014 | Sadiq et al. | ...................... | 705/4 |
| 2015/0149071 A1 * | 5/2015 | Uno | ............................ | 701/408 |

FOREIGN PATENT DOCUMENTS

| | | |
|---|---|---|
| EP | 0122043 A1 | 10/1984 |
| JP | 2001-133281 A | 5/2001 |
| JP | 2005-050273 A | 2/2005 |

(Continued)

*Primary Examiner* — Shelley Chen
(74) *Attorney, Agent, or Firm* — McDermott Will & Emery LLP

(57) ABSTRACT

A system for informing a function of a vehicle includes a plurality of electronic control units (ECUs) to control a corresponding function. A telematics multimedia system center (TMS) terminal receives signal values and state changed values input/output to/from the ECUs and transmits the received signal values and state changed values to outside. A function informing controller controls the TMS terminal and output function informing. A TMS center receives various signal values and state change values through the TMS terminal. A vehicle customer relation management (VCRM) platform provides information about a usage frequency of the corresponding function based on the signal values and the state changed values received. A usage analysis controller controls the VCRM platform and the TMS center so as to transmit the information provided from the VCRM platform to the function informing controller.

10 Claims, 3 Drawing Sheets

(56) References Cited

FOREIGN PATENT DOCUMENTS

| | | | |
|---|---|---|---|
| JP | 2006-048283 A | 2/2006 |
| JP | 2006-168722 A | 6/2006 |
| KR | 2005-0068939 A | 7/2005 |
| KR | 2006-0104732 A | 10/2006 |
| KR | 1020130073718 A | 7/2013 |

\* cited by examiner

SYSTEM FOR INFORMING FUNCTIONS OF VEHICLE

CROSS-REFERENCE TO RELATED APPLICATION

This application claims the benefit of priority to Korean Patent Application No. 10-2013-0114709 filed in the Korean Intellectual Property Office on Sep. 26, 2013, the entire contents of which are incorporated herein by reference.

TECHNICAL FIELD

The present disclosure relates to a system for informing functions of a vehicle, and more particularly, to a system for informing functions of a vehicle, which informs drivers of various functions installed in the vehicle for the drivers to appropriately, actively, and efficiently manipulate the various functions, thereby helping the drivers to confidently operate the functions of the vehicle.

BACKGROUND

Various functions are installed in recent vehicles, but there are many cases where drivers rarely use all the functions or are unskilled in using corresponding functions.

For example, a driver driving a vehicle in which a paddle shift function providing sport transmission while driving is installed, may not be accustomed to the paddle shift function, or may not aware of the function performed by the paddle shift, so that the driver rarely uses the paddle shift function.

For another example, regarding an intermittent wiping function of a wiper system of a vehicle, there are several intermittent periods, but drivers, who are not familiar with the vehicle, are not aware of the function, so that the drivers do not effectively use the intermittent periods.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a system for informing functions of a vehicle, which informs drivers of various functions installed in the vehicle for the drivers to appropriately, actively, and efficiently use the various functions, thereby helping the drivers to confidently operate the functions of the vehicle.

According to an exemplary embodiment of the present disclosure, a system is provided for informing functions of a vehicle. The system includes a plurality of electronic control units (ECUs) installed in the vehicle to control a corresponding function, respectively. A telematics multimedia system center (TMS) terminal is configured to receive signal values and state changed values input/output to/from the plurality of ECUs and transmit the received signal values and the state changed values to the outside. A function informing controller is configured to control the TMS terminal and output function informing through a predetermined terminal. A TMS center is configured to receive various signal values and the state change values related to the corresponding function of the vehicle transmitted through the TMS terminal. A vehicle customer relation management (VCRM) platform is configured to provide information about a usage frequency of the corresponding function and/or a function, which is not used, based on the various signal values and the state changed values received through the TMS center. A usage analysis controller is configured to control the VCRM platform and control the TMS center so as to transmit the information provided from the VCRM platform to the function informing controller.

The function informing controller may inform the corresponding function through a speaker or a display, which is a terminal within the vehicle, based on the information transmitted from the TMS center.

The VCRM platform may analyze a driving tendency of a driver based on the various signal values and the state changed values received through the TMS center, determine whether a function currently used by the driver is optimal to the driving tendency of the driver, and provide information about a substitute function or a recommended function.

The recommended function may include a function which is not used, and a function of which a usage frequency is low to be equal to or lower than a usage number.

The VCRM platform may include a usage frequency calculator configured to calculate the usage frequency of the corresponding function based on the various signal values and the state changed values received through the TMS center. A driving tendency analyzer is configured to analyze a driving tendency of a driver based on the various signal values and the state changed values received through the TMS center. A used-function recognizer is configured to identify a currently used function based on the various signal values and the state changed values received through the TMS center. An optimal function comparator is configured to determine whether a currently used function identified by the used-function recognizer is an optimal function to the driving tendency of the driver in a current driving situation and provide information related to the determination.

The function applied to the vehicle may include a paddle shift function, active eco driving, and auto cruise control (ACC).

When a period of time elapses, the usage analysis controller may provide a function, which is not used, and a function, of which a usage frequency is lower than a predetermined frequency, to the function informing controller through the TMS center based on information calculated by the usage frequency calculator so that the function that is not used, and the function, of which the usage frequency is lower than the predetermined frequency, is informed through a speaker and/or a display of the vehicle.

The function informing controller may inform a substitute function or a recommended function suitable to the driving tendency of the driver identified by the optimal function comparator when a predetermined condition is satisfied.

When the function informing controller receives the information provided from the usage analysis controller through the TMS center and the TMS terminal, the function informing controller may output received contents through the speaker or the display to enable the driver to recognize the received contents.

The VCRM platform may provide the substitute function or the recommended function suitable to the driving tendency of the driver identified by the optimal function comparator to at least one of a vehicle report, a smart phone of the driver, and Internet when the predetermined condition is satisfied.

The usage analysis controller may transmit the information through the TMS center so as for the driver to identify the information output through the speaker or the display of the vehicle through an application of a smart phone or wired/wireless Internet.

As described above, according to the exemplary embodiment of the present disclosure, it is possible to inform a driver of functions, which are not used, or which the driver is not accustomed to use, whenever an event is generated (for example, for each predetermined period) by analyzing usage frequencies of functions applied to the vehicle.

Further, according to the exemplary embodiment of the present disclosure, it is possible to enable a driver to effectively and optimally use a function of a vehicle by analyzing a driving tendency of the driver and informing a substitute function or a recommended function optimized to the tendency of the driver based on a usage of the corresponding function and/or the driving tendency.

Additionally, according to the exemplary embodiment of the present disclosure, a driver may recognize and contact all of the functions applied to a vehicle, thereby becoming a professional and skilled driver.

DETAILED DESCRIPTION

Figure 1:
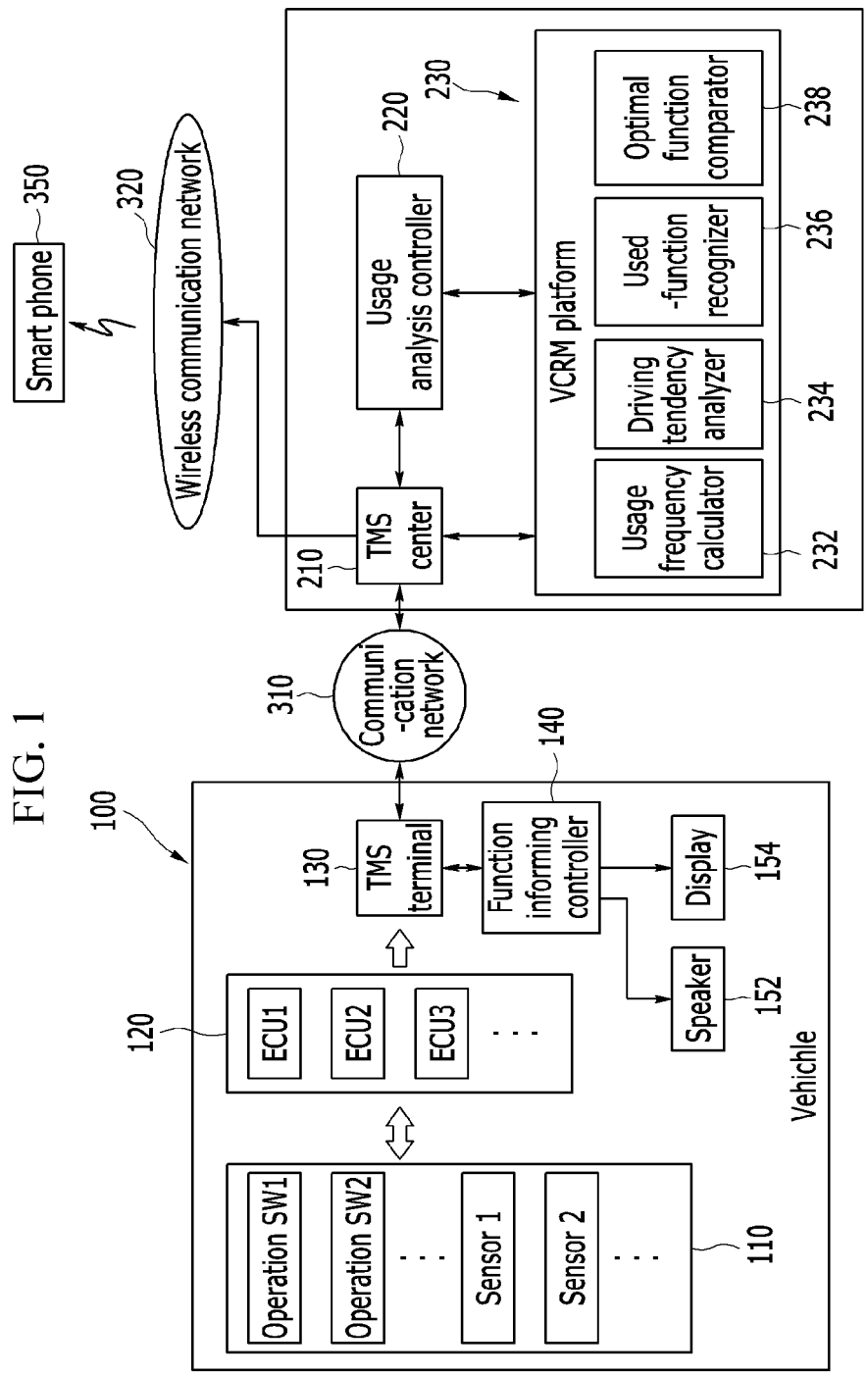
FIG. 1 is a configuration diagram of a function informing system of a vehicle according to an exemplary embodiment of the present disclosure.

Hereinafter, the present disclosure will be described more fully with reference to the accompanying drawings, in which exemplary embodiments of the disclosure are shown. As those skilled in the art would realize, the described embodiments may be modified in various different ways, all without departing from the spirit or scope of the present disclosure.

In addition, unless explicitly described to the contrary, the word "comprise" and variations such as "comprises" or "comprising" is understood to imply the inclusion of stated elements but not the exclusion of any other elements.

In the drawings, in a case where a block includes multiple constituent elements, the multiple constituent elements are denoted by one reference numeral for simplification of a name.

FIG. 1 is a configuration diagram of a function informing system of a vehicle according to an exemplary embodiment of the present disclosure.

The function informing system of a vehicle according to the exemplary embodiment of the present disclosure is an informing system for drivers to appropriately, actively, and effectively manipulate various functions installed in the vehicle.

The function informing system of a vehicle according to an exemplary embodiment of the present disclosure may include a plurality of electronic control units (ECUs) 120 installed in a vehicle 100 to control corresponding functions, respectively, and a telematics multimedia system center (TMS) terminal 130 for receiving a signal value and a state changed value input/output to/from the plurality of ECUs 120 and transmitting the received signal value and the state changed value to outside.

The corresponding functions applied to the vehicle 100 may include a paddle shift function, active eco driving, auto cruise control (ACC), and the like, but the scope of the present disclosure is not essentially limited thereto. If a function is capable of receiving or detecting a signal value and/or a state changed value corresponding to a corresponding function even though the function is different from the aforementioned function, the technical spirit of the present disclosure may be applied to the function.

The paddle shift function, the active eco driving, and the auto cruise control function are functions apparent to those skilled in the art, so that detailed descriptions thereof will be omitted.

The plurality of ECUs 120 receive a signal or a signal value related to a corresponding function from a switch/sensor 110 formed of various operation switches and sensors.

Further, the switch/sensor 110 detects signals related to corresponding operations of the plurality of ECUs 120.

The plurality of ECUs 120 may include an engine control unit ECU1, a transmission control unit ECU2, a body control unit ECU3, an anti-braking system (ABS), a constant speed control unit, and the like, but the scope of the present disclosure is not essentially limited thereto.

The engine control unit, the transmission control unit, the body control unit, the ABS, and the constant speed control unit are apparent to those skilled in the art, so that detailed description thereof will be omitted.

Further, the function informing system of a vehicle according to an exemplary embodiment of the present disclosure may include a function informing controller 140 to output function information through terminals installed in the vehicle, such as a speaker 152 or a display 154, by controlling the TMS terminal 130, a TMS center 210 for receiving various signal values and state changed values related to the corresponding function of the vehicle 100 transmitted through the TMS terminal 130. A vehicle customer relation management (VCRM) platform 230 calculates a usage frequency of the corresponding function based on the various signal values and the state changed values received through the TMS center 210, analyzes a driving tendency, determines whether the currently used function is optimally used to the driving tendency of the driver, and provides information about a function, which is not used, a function (a recommendation function), which is not used or of which a usage frequency is not high, but is recommendable, and a function that may substitute the currently used function. A usage analysis controller 220 controls the VCRM platform 230 and the TMS center 210 to transmit the information provided from the VCRM platform 230 to the function informing controller 140.

The VCRM platform 230 analyzes the driving tendency of the driver based on the various signal values and the state changed values received through the TMS center 210, determines whether the function currently used by the driver is optimal to the driving tendency of the driver, and provides the information about the substitute function or the recommended function.

The recommended function may include a function that the driver has not used, and a function that the driver uses for a usage number of times or fewer, that is, a function with a low usage frequency. The TMS terminal 130 and the TMS center 210 may be connected through a wireless communication network 310.

The function informing controller 140 may inform a corresponding function through the speaker 152 or the display 154 based on the information transmitted from the TMS center 210.

The function informing controller 140 and the usage analysis controller 220 may be formed of one or more microprocessors operated by a set program, or a hardware including the microprocessors. The set program may include a series of commands for performing an operating process of the function informing system of a vehicle according to the present disclosure to be described below.

The TMS terminal 130, the TMS center 210, and the VCRM platform 230 may adopt a TMS terminal, a TMS center, and a VCRM platform publicly known to the corresponding technical field. Accordingly, detailed descriptions of the TMS terminal, the TMS center, and the VCRM platform according to an exemplary embodiment of the present disclosure will be omitted.

Similarly, the speaker 152 and the display 154 may correspond to a speaker and a display mounted in a vehicle, which are publicly known to the corresponding technical field, so that detailed descriptions of the speaker and the display according to an exemplary embodiment of the present disclosure will be omitted.

The VCRM platform 230 may include a usage frequency calculator 232 for calculating a usage frequency of the corresponding function based on the various signal values and the state changed values received through the TMS center 210. A driving tendency analyzer 234 analyzes the driving tendency of the driver based on the various signal values and the state changed values received through the TMS center 210. A used-function recognizer 236 identifies a currently used function based on the various signal values and the state changed values received through the TMS center 210. An optimal function comparator 238 determines whether the currently used function identified by the used-function recognizer 236 is an optimal function to the driving tendency of the driver in a current driving situation and provides information about the determination.

The VCRM platform 230 may provide a substitute function or a recommended function suitable to the driving tendency of the driver identified by the optimal function comparator 238 to at least one of a vehicle report, a smart phone of the driver, and the Internet through the TMS center 210 when a condition is satisfied.

The usage frequency calculator 232, the driving tendency analyzer 234, the used-function recognizer 236, and the optimal function comparator 238 may operate by software or by a combination of software and hardware.

When a period of time elapses, the usage analysis controller 220 may provide a function, which is not used, and a function of which a usage frequency is lower than a predetermined usage frequency to the function informing controller 140 through the TMS center 210 based on the information calculated by the usage frequency calculator 232. Thus, the function, which is not used, and the function, of which the usage frequency is lower than the predetermined usage frequency, may be informed through the speaker 152 and/or the display 154 of the vehicle.

The function informing controller 140 may inform a substitute function or a recommended function suitable to the driving tendency of the driver in a driving situation identified by the optimal function comparator 238 or other situations (for example, a non-driving situation) through the speaker 152 and/or the display 154 when a condition is satisfied.

When the function informing controller 140 receives the information provided from the usage analysis controller 220 through the TMS center 210 and the TMS terminal 130, the function informing controller 140 outputs the received contents through the speaker 152 or the display 154 for the driver to recognize the received contents.

The usage analysis controller 220 may transmit the information through the TMS center 210 so as to identify the information output through the speaker 152 or the display 154 of the vehicle 100 through an application or the wired/wireless Internet (not illustrated) of a smart phone 350. In this case, the TMS center 210 may be connected with the smart phone 350 through the wireless communication network 320.

Hereinafter, an operation of the function informing system of a vehicle according to an exemplary embodiment of the present disclosure will be described in detail with reference to the accompanying drawings.

Figure 2:
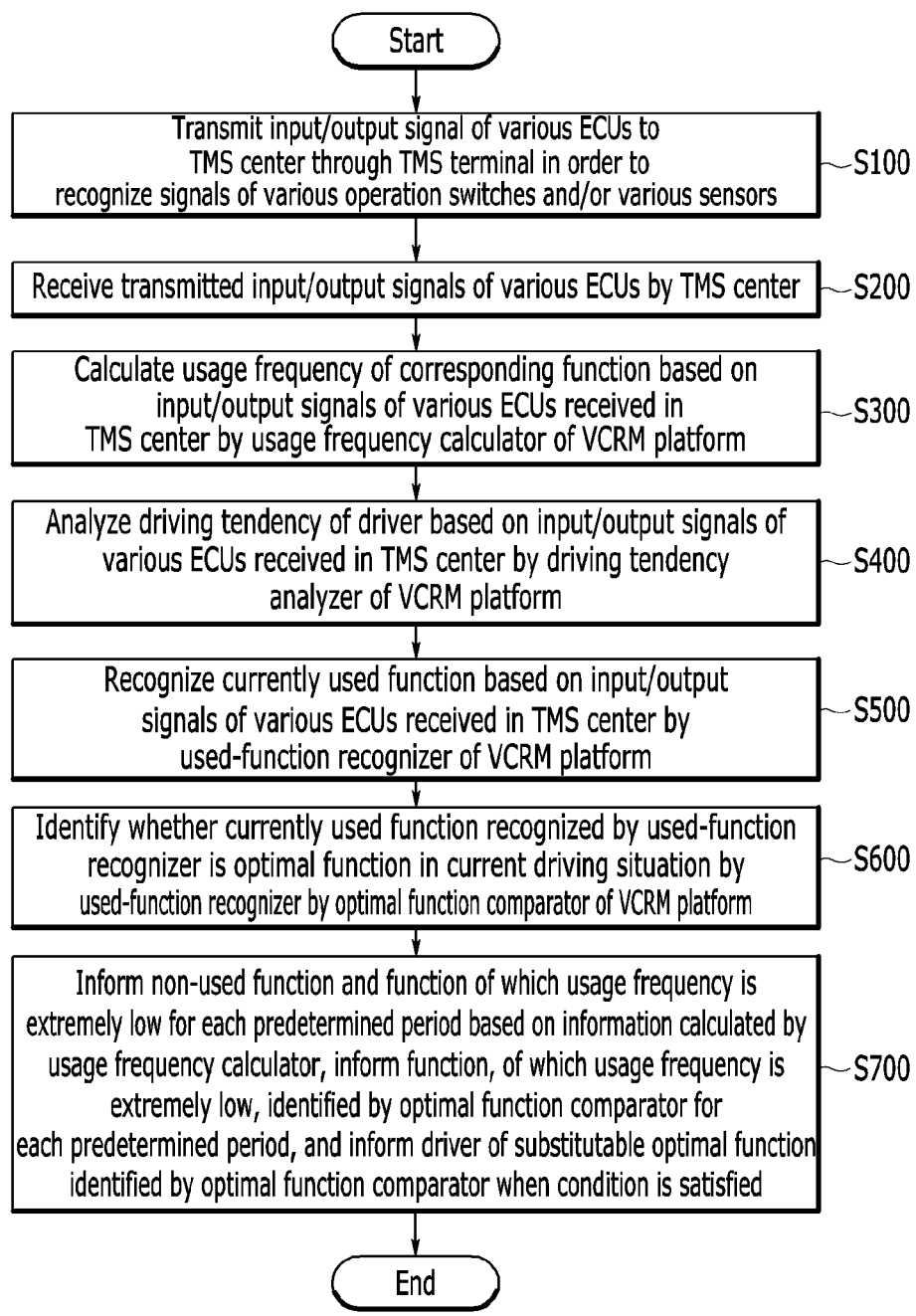
FIG. 2 is a flowchart for describing an operation of a function informing system of a vehicle according an exemplary embodiment of the present disclosure.

FIG. 2 is a flowchart for describing an operating process of the function informing system of a vehicle according the exemplary embodiment of the present disclosure. The function informing system of a vehicle according an exemplary embodiment of the present disclosure transmits input/output signals of various ECUs (for example, an engine control unit, a transmission control unit, an auto cruise control unit, and a body control unit, and the like) included in the plurality of ECUs 120 to the TMS center 210 through the TMS terminal 130 in order to recognize signals of the various operation switches and/or the various sensors included in the switch/sensor 110 of FIG. 1 (S100).

The TMS terminal 130 may receive or detect the input/output signals of the various ECUs under control of the function informing controller 140. The TMS terminal 130 receives or detects the input/output signals of the various ECUs, and transmits the received or detected signals to the TMS center 210 through the wireless communication network 310 under control of the function informing controller 140.

Figure 3:
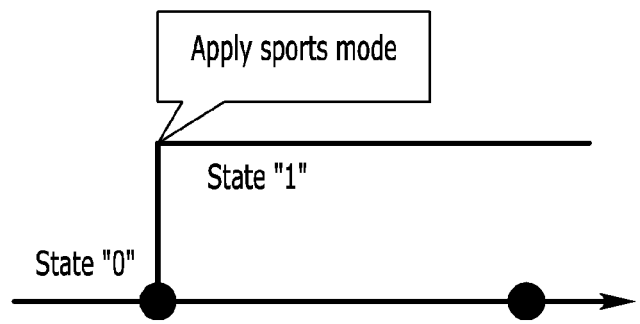
FIG. 3 is a diagram for describing a function informing system of a vehicle according an exemplary embodiment of the present disclosure.

For example, in a case where the paddle shift function is installed in the vehicle, when a driver moves a transmission lever to a manual gear to a sports mode in order to use the paddle shift function as illustrated in FIG. 3, in the input/output signal, a state value is changed from 0 to 1 at a corresponding terminal of the transmission ECU, and the changed value may be transmitted to the TMS center 210 through the TMS terminal 130 under control of the function informing controller 140 of the present disclosure.

Accordingly, when the input/output signals of the various ECUs are transmitted through the TMS terminal 130, the TMS center 210 receives the transmitted signals, and provides the received signals to the VCRM platform 230 and the usage analysis controller 220 (S200).

When the input/output signals of the various ECUs are provided to the VCRM platform 230, the VCRM platform 230 may perform the operations below under control of the usage analysis controller 220.

That is, the usage frequency calculator 232 of the VCRM platform 230 calculates a usage frequency of a corresponding function based on the received input/output signals under the control of the usage analysis controller 220 (S300).

When the usage frequency of the corresponding function is calculated in step S300, the driving tendency analyzer 232 of the VCRM platform 230 analyzes a driving tendency of the driver based on the calculated usage frequency under the control of the usage analysis controller 220 (S400).

When the driving tendency of the driver is analyzed in step S400, the used-function recognizer 236 of the VCRM platform 230 recognizes a currently used function under the control of the usage analysis controller 220 (S500).

When the currently used function is recognized in step S500, the optimal function comparator 238 of the VCRM platform 230 identifies whether the currently used function recognized by the used-function recognizer 236 under control of the usage analysis controller 220 is an optimal function of the driving tendency of the driver in a current driving situation (S600).

The VCRM platform 230 may identify the optimal function of the driving tendency of the driver through the optimal function comparator 238, and determine a recommended function suitable to the tendency of the driver even though the recommended function is not used by the driver, or a usage frequency of the recommended function is equal to or lower than a predetermined usage number.

When steps S100 to S600 are performed as described above, and a period of time (for example, 30 days and 100 days) elapses, the usage analysis controller 220 provides a non-used function or a function, of which a usage frequency is extremely low (for example, one time/month or one time/ 20,000 km (driving distance)), to the function informing controller 140 through the TMS center 210 based on the information calculated by the usage frequency calculator 232 so that the non-used function or the function, of which the usage frequency is extremely low, is informed through the speaker 152 and/or the display 154 of the vehicle (S700).

Further, the usage analysis controller 220 provides the substitute function (for example, a sports mode) or the recommended optimal function of the driving tendency of the driver in the driving situation identified by the optimal function comparator 238 or other situation (for example, a non-driving situation) provides the function informing controller 140 through the TMS center 210 so that the substitute function or the recommended function may be informed to the driver through the speaker 152 and/or the display 154 of the vehicle when a condition is satisfied (for example, when the driver drives the vehicle in a normal mode while driving a mountain road) (S700).

When the function informing controller 140 receives the information provided from the usage analysis controller 220 through the TMS center 210 and the TMS terminal 130, the function informing controller 140 outputs the received contents through the speaker 152 or the display 154 to enable the driver to recognize the received contents (S700).

The usage analysis controller 220 may transmit the information through the TMS center 210 so that the driver may identify the information output through the speaker 152 or the display 154 of the vehicle 100, and through an application of a smart phone 350 or a wired/wireless Internet, a technology of which is apparent to those skilled in the art, so that a detailed description thereof will be omitted.

As described above, the function informing system of a vehicle according to an exemplary embodiment of the present disclosure may analyze the signal value of the sensor, the switch (button), and the like related to the corresponding function applied to the vehicle 100 or the state value related to the function, and/or a usage history to identify whether the corresponding function is used and/or a usage frequency of the corresponding function.

Accordingly, it is possible to recognize a function which the user (driver) does not use for a period of time. The signal value and/or the state value related to the corresponding function may be identified through the signal input to the related ECU.

For example, in a case of the paddle shift mounted vehicle as described above, when the gear lever is located in a sports mode, the state value related to the sports mode is changed from 0 to 1 as illustrated in FIG. 3, and it is possible to identify whether the paddle shift function is used and a usage frequency of the paddle shift function by using a changed value of the signal.

Further, the function informing system of the vehicle according to the exemplary embodiment of the present disclosure may inform the driver of a non-recognized function or a non-used function for each period of time based on the usage frequency of the corresponding function identified as described above to induce the driver to use the corresponding function.

In the meantime, the function informing system of the vehicle according to the exemplary embodiment of the present disclosure may analyze a driving tendency of a driver by analyzing the signal values of the sensor, the switch (button), and the like related to the corresponding function applied to the vehicle or the state value related to the function, analyzing the usage history, and/or applying statistics of/analyzing a driving information value, and inform a substitute function or recommended function more preferable to the driving tendency of the driver in a current driving situation or other situations based on the analyzed information.

The driving information value for drawing the driving tendency of the driver may include, for example, a driving speed, an average driving distance, a driving time, a preheating time, the number of times of sudden acceleration/deceleration, an idle time, average fuel efficiency, driving for city commuting based on GPS information, a long distance/short distance, and the like. The information values thereof may be easily obtained through an existing technology.

The VCRM platform 230 may analyze the driving tendency of the driver by transmitting the driving information value collected during the driving of the vehicle, and the signal value of the sensor, the switch (button), and the like related to the used function, or the state value related to the function to the TMS center 210 through the TMS terminal 130.

The VCRM platform 230 may identify whether the driver optimally uses the corresponding function applied to the vehicle so as to be suitable to the driving tendency by analyzing the information of the driving tendency of the driver collected for a period of time.

Further, when it is identified that the driver does not optimally use the corresponding function during driving, the function informing system of the vehicle according to the exemplary embodiment of the present disclosure informs the driver of the substitute function or the recommended function and enables the driver to optimally use the vehicle so as to be suitable to the driving tendency.

For example, the function informing system of the vehicle according to the exemplary embodiment of the present disclosure may recommend the driving of the vehicle by substituting a current mode with an active eco mode according to city driving/high-speed driving, a road environment, or a driving habit, to a driver who tends to lay emphasis on high average fuel efficiency because the driver mainly uses a general road, rather than an expressway.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A system for informing functions of a vehicle, comprising:
    a plurality of electronic control units (ECUs) installed in the vehicle to perform controls of a corresponding function, respectively;
    a telematics multimedia system center (TMS) terminal configured to receive signal values and state changed values input/output to/from the plurality of ECUs and transmit the received signal values and state changed values to the outside;

a function informing controller configured to control the TMS terminal and output function informing;

a TMS center configured to receive various signal values and state change values related to a corresponding function of the vehicle transmitted through the TMS terminal;

a vehicle customer relation management (VCRM) platform configured to provide information about a usage frequency of the corresponding function and/or a function, which is not used, based on the various signal values and state changed values received through the TMS center; and a usage analysis controller configured to control the VCRM platform, and control the TMS center so as to transmit the information provided from the VCRM platform to the function informing controller, wherein the VCRM platform analyzes a driving tendency of a driver based on the various signal values and state changed values received through the TMS center, determines whether a function used by the driver is optimal to the driving tendency of the driver, and provides information about a substitute function or a recommended function.

2. The system of claim 1, wherein:
the function informing controller informs the corresponding function through a speaker or a display within the vehicle based on the information transmitted from the TMS center.

3. The system of claim 1, wherein the recommended function includes a function which is not used, and a function of which a usage frequency is equal to or lower than a usage number.

4. The system of claim 1, wherein the VCRM platform includes:
a usage frequency calculator configured to calculate a usage frequency of the corresponding function based on the various signal values and state changed values received through the TMS center;

a driving tendency analyzer configured to analyze a driving tendency of a driver based on the various signal values and state changed values received through the TMS center;

a used-function recognizer configured to identify a currently used function based on the various signal values and state changed values received through the TMS center; and an optimal function comparator configured to determine whether a currently used function identified by the used-function recognizer is a function optimal to the driving tendency of the driver in a current driving situation and provide information related to the determination.

5. The system of claim 1, wherein the function applied to the vehicle includes a paddle shift function, active eco driving, and auto cruise control (ACC).

6. The system of claim 4, wherein when a period of time elapses, the usage analysis controller provides a function, which is not used, and a function, of which a usage frequency is lower than a predetermined frequency, to the function informing controller through the TMS center based on the information calculated by the usage frequency calculator so that the function, which is not used, and the function, of which the usage frequency is lower than the predetermined usage frequency, is informed through a speaker and/or a display of the vehicle.

7. The system of claim 6, wherein the function informing controller informs a substitute function or a recommended function suitable to the driving tendency of the driver identified by the optimal function comparator when a predetermined condition is satisfied.

8. The system of claim 7, wherein the VCRM platform provides the substitute function or the recommended function suitable to the driving tendency of the driver identified by the optimal function comparator to at least one of a vehicle report, a smart phone of the driver, and the Internet through the TMS center when a condition is satisfied.

9. The system of claim 4, wherein when the function informing controller receives the information provided from the usage analysis controller through the TMS center and the TMS terminal, the function informing controller outputs the received contents through the speaker or the display to enable the driver to recognize the received contents.

10. The system of claim 4, wherein the usage analysis controller transmits the information through the TMS center for the driver to identify the information output through the speaker or the display through an application of a smart phone or the wired/wireless Internet.

* * * * *